United States Patent [19]

Ziegler

[11] 4,040,851

[45] Aug. 9, 1977

[54] COTTON-CEMENT ARTICLES

[75] Inventor: B. Randall Ziegler, Freehold, N.J.

[73] Assignee: GAF Corporation, New York, N.Y.

[21] Appl. No.: 582,165

[22] Filed: May 30, 1975

[51] Int. Cl.$^2$ ............................................... C04B 7/353
[52] U.S. Cl. ........................................ 106/93; 106/99
[58] Field of Search ................. 106/99, 120, 90, 93

[56] References Cited

U.S. PATENT DOCUMENTS

| 3,501,323 | 3/1970 | Moorehead | 106/120 |
|---|---|---|---|
| 3,505,439 | 4/1970 | Moorehead et al. | 106/120 |
| 3,645,961 | 2/1972 | Goldfein | 106/90 |
| 3,679,445 | 7/1972 | Howe | 106/99 |
| 3,753,749 | 8/1973 | Nutt | 106/99 |
| 3,753,751 | 8/1973 | Shannon | 106/120 |
| 3,841,885 | 10/1974 | Jakel | 106/99 |
| 3,926,653 | 12/1975 | Shannon et al. | 106/120 |

Primary Examiner—J. Poer
Attorney, Agent, or Firm—Walter C. Kehm; Joshua J. Ward

[57] ABSTRACT

A cotton reinforced, cementitious, hydrated product is made by combining on a dry basis between about 25 and about 75 wt. % Portland cement, between about 1 and about 15 wt. % cotton fiber, between about 3 and about 30 wt. % inorganic filler and preferably between about 10 and about 40 wt. % silica with water to form an aqueous slurry. The slurry is formed into desired shapes such as sheets or slabs and cured by autoclaving to produce the desired product.

22 Claims, No Drawings

COTTON-CEMENT ARTICLES

BACKGROUND OF THE INVENTION

Building materials for various uses such as roof and wall coverings, pipes, etc. have been manufactured commercially for many years cementitious products reinforced with various fibers. Asbestos fibers have been especially popular for this purpose; however, asbestos fiber is becoming relatively expensive and its use may require special care to avoid various health-related problems.

SUMMARY OF THE INVENTION

It is a major object of the present invention to provide an improved fiber reinforced cementitious construction material which does not require the use of asbestos fiber. A method of making such material is also provided.

The product of the present invention is the fiber reinforced cementitious hydrated reaction product of curing a reaction mixture containing Portland cement, cotton fiber, inorganic filler and at least sufficient water to supply water of hydration for the curing process. Portland cement is present in the mixture in amounts between about 25 and about 75 weight percent (wt.%) on a dry basis while cotton fiber is present in amounts between about 1 and about 15 wt. % and filler is present in amounts between about 3 and about 30 wt. %, preferably between about 5 and about 20 wt. %, on the same basis. In a preferred embodiment of the invention in which the curing is by autoclaving, the reaction mixture also includes on a dry basis between about 10 and about 40 wt. % silica.

The process of the invention broadly involves combining Portland cement, cotton fiber and inorganic filler in the proportion mentioned above with water to provide a reaction mixture of the type described above and then forming and curing the desired cementitious material from the reaction mixture. In a preferred embodiment excess water is used to form an aqueous slurry from which the desired product is formed and cured. Curing is preferably by autoclaving with the reaction mixture including silica as described above.

DETAILED DESCRIPTION OF THE INVENTION

As mentioned above the product of the invention is a fiber reinforced cementitious hydrated reaction product of curing a mixture of Portland cement, cotton fiber, inorganic filler and, in a preferred embodiment, silica. In general these products are useful in the same applications in which conventional asbestos cement products are used, eg. as slabs or shingles for siding, certain types of roofing, and some interior uses in the construction industry. Such products may also be used for other purposes such as pipes, cooling tower fill, etc.

Any of the conventional types of Portland cement may be used in forming the reaction mixture from which the products of the invention are formed. As mentioned, cement is present in the reaction mixture in amounts between about 25 and about 75 wt. % on a dry basis. While any type of Portland cement is suitable, types I or II are especially preferred in practicing the invention.

Cotton fibers are apparently uniquely suited to the product and process of the invention since they disperse readily and process easily using conventional manufacturing techniques to yield a product with good physical properties at low cost. Also, cotton, because of its lower density, can be used in amounts (based on weight) of only about one half the amounts of asbestos which would be needed and at a considerable savings in cost over the cost of asbestos for similar products. Other fibers appear to be deficient in one or more respects. For instance, metal fibers are too coarse and stiff to handle readily and settle badly in the aqueous slurry which is used in practicing the preferred process of the invention. Glass fibers are expensive, have poor dispersability in an aqueous slurry and tend to form wads which settle and drain too quickly for processing on conventional equipment. Synthetic fibers such as polyester, nylon, acetates, etc. are difficult to disperse, tend to form strings on mixing equipment and are not as hydrophilic as cotton. Many synthetic fibers are also adversely affected by exposure to conditions present during autoclaving or steam curing. Wood fibers require extensive chemical processing to remove wood lignins and sugars which have a deleterious affect on the strength development of the product. Processing of wood fibers to render them acceptable would be expensive.

Preferred cotton fiber for use in the invention is free of oils and waxes and preferably has a fiber length between about 1 and about 25 millimeters (mm). Cotton waste fiber from finished cotton products is generally oil and wax free and is thus highly suitable for use in the invention. If necessary, cotton fiber may be freed of waxes and oils by the use of suitable solvents or surfactants. Cotton fiber is preferably used in the reaction mixture and product of the invention in amounts between 1 and about 15 wt. % on a dry basis as compared with between about 25 and 75 wt. % Portland cement and between about 3 and about 30 wt. % filler.

The inorganic filler used in the invention preferably has a particle size of less than about 1.5 mm and a density between about 90 and about 1300 kilograms per cubic meter (kg/m$^3$). Any inorganic minerals which do not adversely affect the hydration of the cement are suitable for use as filler. Such minerals include, for instance, expanded perlite, talc, limestone, fly ash, slate dust, diabase stone dust, etc. Expanded perlite having a density between about 90 and about 200 kg/m$^3$ is preferred for the production of low density product.

In a preferred embodiment of the invention the reaction mixture of Portland cement, cotton fiber, filler and water also contains on a dry basis at least about 10 wt. % and more preferably between about 10 and about 40 wt. % silica. Silica used in the present invention is of small particle size with particle sizes less than about 0.15 mm generally being preferred. Diatomaceous silica is an especially preferred form of silica because of its low density but other suitable forms of silica such as pulverized silica flour may be used if higher density product is desired. It is essential that silica be used when the reaction mixture is cured by autoclaving as described below. During autoclaving the silica reacts with lime liberated from the cement during the autoclave curing process to yield calcium silicate. Use of silica in this manner provides additional strength to the finished product and reduces blooming due to the presence of free lime in he product. Such blooming causes coating adhesive problems and in many instances discoloration of painted surfaces on finished products. While an excess of silica is not generally harmful, insufficient silica in conjunction with autoclave curing frequently leads to serious blooming problems of the type described.

Water must be present in the reaction mixture of the invention in amounts at least sufficient to provide necessary water of hydration for the curing process. Excess water is usually preferred. Water present in the reaction mixture is preferably present in amounts between about 10 and about 40 weight percent of the mixture. Water present in the water slurry used in forming products of the invention by the preferred process of the invention conveniently amounts to between about 80 and about 90 weight percent of the slurry. The use of such amounts of water allows for convenient and easy processing and good dispersion of materials throughout the slurry. Excess water is easily drained or pressed from the slurry during formation of the desired sheets, slabs, etc. prior to curing.

In addition to the ingredients mentioned above, other optional ingredients for use in the invention include conventional materials such as flocculant, thickener, etc. Thickeners when used are normally used in amounts between about 0.1 and about 1.0 wt. % based on total solids. Thickeners are frequently employed when a water slurry is formed into sheets on sheet forming machines such as the conventional Hatschek machine but need not be used where forming is by means of filter press, or dry forming machines. Enough thickener is generally used to yield a homogeneous suspension and desired drainage rate without having enough thickener present to retard drainage. Suitable thickeners include various water soluble cellulisic polymers such as hydroxyethyl cellulose. In addition to the thickener, small quantities, usually less than about 0.1 wt. %, of polymeric flocculant may also be added to assist in drainage.

If desired, a portion of the product of the invention may comprise recycled scrap material of similar composition. Where used such scrap is preferably reduced in size to particles less than about 1.5 mm and is blended in with raw materials to form a homogeneous reaction mixture. Such scrap material may be used in amounts up to about 25 percent of the total solids content of the reaction mixture and is frequently used in amounts between about 10 and about 15 percent.

Preferred products of the invention have a density between about 800 and about 1600 kg/m$^3$ and, as mentioned above, frequently take the form of construction slabs or shingles. Where diatomaceous silica and expanded perlite are used, preferred products frequently have densities between about 800 and about 1000 kg/m$^3$. Depending upon configuration and method of construction, such products may be monolithic or may be laminated products formed of two or more layers of materials. In forming such laminated products the individual layers frequently have thicknesses between about 1 and about 4 mm and the laminated product has a thickness of between about 2 and about 15 mm.

The process of the invention broadly comprises combining Portland cement, cotton fiber, inorganic filler and water to form a reaction mixture from which the desired product is formed and cured. The relative amounts of materials used are as described above. In a preferred embodiment the curing is accomplished by autoclaving and the reaction mixture contains silica in addition to the cement, cotton, filler and water. Silica is preferably used in amounts of at least about 10, more usually between about 10 and about 40 weight percent of the solids content of the reaction mixture. For low density product, diatomaceous silica is preferred.

The desired configurations of products may be formed in any suitable manner such as by the use of filter presses, dry forming machines, etc. A preferred process involves the use of a conventional multicylinder sheet forming machine generally known as a Hatschek machine which results in the formation of sheets between about 2 and about 15 mm thick. For most efficient operation of this type of equipment the slurry entering the machine preferably contains between about 80 and about 90 wt. % water. In forming the slurry the dry ingredients are preferably first mixed by suitable means such as a conventional ribbon-type blender and are then mixed with the desired amount of water, usually at temperatures between about 10° and about 50° C.

The preferred autoclaving process used as the curing step in the present invention is a conventional autoclaving in which the products being cured are subjected to the action of saturated steam for periods of time typically ranging from about 4 to about 20 hours under pressures between about 500 and about 1000 kilopascals (kPa). During the autoclaving process the silica which is included in the reaction mixture when this curing process is used reacts with the lime liberated during the curing process to form calcium silicates and thereby reduce lime blooming in the finished product which would be a result of using the autoclaving curing process without having such silica present. While autoclaving is the preferred curing process, it should be understood that other known curing processes may be used. For instance, steam curing at atmospheric pressure or air exposure to normal atmospheric conditions for a period of 3 or 4 weeks may be resorted to, although such other curing processes are not generally as suitable in that they take considerably more time and frequently result in less satisfactory product.

The following examples will illustrate products and processes of the present invention. These examples are illustrative only and are not intended to limit the scope of the invention.

EXAMPLE I

This example illustrates the preparation of a preferred low density product of the invention by a preferred process of the invention. In this example the following ingredients are used.

| Ingredient | Weight Percent (Dry Basis) |
| --- | --- |
| Portland cement type I | 50.1 |
| Diatomaceous silica | 18.6 |
| Expanded Perlite | 9.3 |
| Ground scrap of similar composition to product | 15.5 |
| Cotton fibers | 6.2 |
| Hydroxyethyl cellulose | 0.3 |

The cotton fibers used in this formulation have an average length of 1.5 mm. The epxanded perlite has a density of 120 kg/m$^2$ and the scrap is ground to a maximum particle size of 1.4 mm.

The above ingredients are dry mixed in a ribbon-type blender and then mixed with water at a temperature of 40° C to yield a slurry containing 15 weight percent solids. This slurry is fed to the vats of a Hatschek sheet forming machine resulting in the formation of a laminated sheet about 7.5 mm thick containing about 70 weight percent solids. After hardening for a day, the sheets thus formed are trimmed to their final size of 37 × 61 centimeters (cm) and cured in an autoclave in a cured to form finished product by any suitable means as mentioned above.

TABLE I

| Ingredient | Mixture No. | 1 | 2. | 3 | 4 | 5 | 6 | 7 | 8 | 9 | 10 |
|---|---|---|---|---|---|---|---|---|---|---|---|
| Portland Cement type I | | 25 | | | | | | 75 | 41 | 50 | 50 |
| Portland Cement type II | | | 35 | | | | | | | | |
| Portland Cement type III | | | | 45 | | | | | | | |
| Portland Cement type IV | | | | | 55 | | | | | | |
| Portland Cement type V | | | | | | 55 | 47 | | | | |
| Diatomaceous silica | | 40 | | | 14 | 10 | | | 17 | 20 | |
| Silica flour | | | 40 | | 26.7 | | 20 | | | | |
| Cotton fiber (1 mm) | | | | | | | | | 10 | 8 | 6 |
| Cotton fiber (7 mm) | | 15 | 12 | 5 | 3 | 1 | | | | | |
| Cotton fiber (15 mm) | | | | | | | 5 | 10 | | | |
| Ground scrap | | 14.9 | | 15 | | 17.2 | 17 | | 24 | 18 | 41 |
| Ground perlite | | | 7 | | 15 | | | | | | |
| Expanded perlite | | 5 | | 20 | | 6 | 8 | 15 | | 4 | 3 |
| Hydroxyethyl cellulose | | 0.1 | 1.0 | | 0.3 | 0.8 | | | | | |
| Limestone | | | | 5 | 1 | 10 | 3 | | 8 | | | saturated steam atmosphere at 790 kPa for five hours at a temperature of 170° C. After autoclaving the sheets are dried in an oven to a moisture content of about 10% and are then painted with a thermoset acrylic emulsion paint. The paint is then dried and baked under radiant gas burners and the sheets bundled. The finished sheets have a flexural strength of 8.96 megapascals (MPa) in the weaker direction and a density of 930 kg/m³. The sheets are especially useful as exterior siding for housing or other buildings.

EXAMPLE II

This example illustrates the use of the process of the invention to produce a product according to the invention having slightly higher density than the product of Example I. In this example the following ingredients are used in the reaction mixture:

| Ingredient | Weight Percent (Dry Basis) |
|---|---|
| Portland cement type I | 39.7 |
| Ground scrap | 14.0 |
| Pulverized silica flour | 28.4 |
| Ground limestone | 6.1 |
| Ground Perlite fines | 5.3 |
| Cotton fiber | 6.2 |
| Hydroxyethyl cellulose | 0.3 |

The cotton fiber and scrap used is the same as is used in Example I. This formulation is processed in the manner described in Example I but at a total sheet thickness of 3.8 mm and yields a product with a flexural strenght of 20.68 MPa and a density of 1600 kg/m³.

EXAMPLE III

A slurry may be formed as in Example I and a monolithic slab product produced therefrom by use of a filter press to produce a slab measuring 61 cm × 91 cm by 3.8 cm thick. This slab is cured by exposure to the atmosphere for 28 days.

EXAMPLE IV

Additional reaction mixtures usable in accordance with the invention to produce products of the invention include the mixtures of solids indicated in Table I below in reaction mixtures containing from about 20 to about 40 wt. % water to provide sufficient water of hydration. Amounts in Table I are expressed in weight percents based on solids and it is understood that such reaction mixtures may be formed from aqueous slurries containing additional water as described above and may be cured to form finished product by any suitable means as mentioned above.

When samples of products made according to Example I are tested for retention of strength, it is found that, contrary to expectations the strength properties imparted by the cotton fibers are retained under conditions simulating product use in exterior building applications. Such strength retention is demonstrated by exposing the sample pieces in controlled environment chambers maintained at 27° – 32° C and a relative humidity of 80 –100%. One such chamber is maintained in darkness to encourage growth of photophobic microorganisms with very little fresh makeup air being added while another chamber is lighted by natural daylight to encourage growth of photophilic microorganisms and has a moderate flow of warm air passed through it by natural convection convection through small openings. Samples of product made as described in Example I show no loss of flexural strength after storage in such chambers up to 18 months. This is surprising since it is known that cellulosic materials normally degrade under such conditions.

While the invention has been described above with respect to preferred embodiments thereof, it will be understood that various changes and modifications may be made without departing from the spirit or scope of the invention.

What is claimed is:

1. A fiber reinforced cementitious hydrated reaction product of curing a reaction mixture comprising on a dry basis:
   a. between about 25 and about 75 wt. % Portland cement;
   b. between about 1 and about 15 wt. % cotton fiber;
   c. between about 3 and about 30 wt. % inorganic filler; and
   d. at least sufficient water to supply water of hydration.

2. The reaction product of claim 1 in which the mixture is cured by autoclaving and in which the mixture includes on a dry basis at least about 10 wt. % silica.

3. The reaction product of claim 2 in which the mixture includes silica in amounts between about 10 and about 40 wt. % on a dry basis and the filler comprises perlite or limestone.

4. The reaction product of claim 3 in which the filler comprises perlite particles averaging less than about 1.5 mm in size and having a density between about 90 and about 200 kg/m³ and the silica is diatomaceous silica.

5. The reaction mixture of claim 4 in which at least a majority of the cotton fibers have lengths between about 1 and about 25 mm.

6. The reaction mixture of claim 5 which also includes between about 0.1 and about 1.0 wt. % on a dry basis of hydroxyethyl cellulose.

7. A laminated sheet reaction product according to claim 2 between 2 and about 15 mm thick.

8. A monolithic reaction product of claim 2.

9. The reaction product of claim 2 in which at least a majority of the cotton fibers lengths between about 1 and about 25 mm.

10. The reaction product of claim 2 in which the silica is diatomaceous silica.

11. A reaction product according to claim 5 and having a density between about 800 and about 1000 kg/m$^3$.

12. A process for making cotton reinforced cementitious material which comprises:
   a. combining water with, on a dry basis, between about 25 and about 75 wt. % Portland cement, between about 1 and about 15 wt. % cotton fiber and between about 3 and about 30 wt. % inorganic filler to form a reaction mixture; and
   b. forming and curing said material from said mixture 13. The process of claim 12 in which the cement, cotton and filler are combined with sufficient water to form an aqueous slurry and excess water is then removed to form the reaction mixture.

14. The process of claim 13 in which the aqueous slurry contains between about 80 and about 90 wt. % water.

15. The process of claim 12 in which the reaction mixture contains between about 10 and about 40 wt. % water.

16. The process of claim 15 in which the reaction mixture also contains, on a dry basis, at least about 10 wt. % silica and in which curing of said material is by autoclaving.

17. The process of claim 16 in which the slurry contains between about 10 and about 40 wt. % silica on a dry basis.

18. The process of claim 17 in which the reaction mixture is formed into laminated sheets between about 2 and about 15 mm thick.

19. The process of claim 17 in which the filler comprises perlite particles of less than about 1.5 mm size and having a density between about 90 and about 200 kg/m$^3$ and the silica is diatomaceous silica.

20. The process of claim 19 in which at least the majority of the cotton fibers are between about 1 and about 25 mm in length.

21. Product produced according to the process of claim 20 and having a density of between about 800 and about 1000 kg/m$^3$.

22. A product according to claim 21 which includes between about 10 and about 15 wt. % recycled scrap material of similar composition.

* * * * *